(12) United States Patent
Debreyer et al.

(10) Patent No.: US 10,455,933 B2
(45) Date of Patent: *Oct. 29, 2019

(54) GLASS CERAMIC WORKTOP

(71) Applicant: EUROKERA S.N.C., Chateau-Thierry (FR)

(72) Inventors: Gregory Debreyer, Montcourt Fromonville (FR); Franck Demol, Reims (FR); Nicolas Roux, Chateau-Thierry (FR); Pablo Vilato, Paris (FR)

(73) Assignee: EUROKERA S.N.C., Chateau-Thierry (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/757,682

(22) PCT Filed: Sep. 6, 2016

(86) PCT No.: PCT/FR2016/052217
§ 371 (c)(1),
(2) Date: Mar. 6, 2018

(87) PCT Pub. No.: WO2017/042478
PCT Pub. Date: Mar. 16, 2017

(65) Prior Publication Data
US 2019/0021485 A1     Jan. 24, 2019

(30) Foreign Application Priority Data
Sep. 8, 2015 (FR) .................................... 15 58347

(51) Int. Cl.
*A47B 13/12* (2006.01)
*A47B 96/18* (2006.01)
(Continued)

(52) U.S. Cl.
CPC .............. *A47B 13/12* (2013.01); *A47B 96/18* (2013.01); *C03C 10/00* (2013.01); *F24C 7/082* (2013.01); *F24C 15/10* (2013.01)

(58) Field of Classification Search
CPC .......... A47B 13/12; F24C 7/082; F24C 15/10; C03C 10/00
(Continued)

(56) References Cited

U.S. PATENT DOCUMENTS 3,636,309 A * 1/1972 Deaton .................... H02H 5/10
219/446.1
5,746,114 A 5/1998 Harris
(Continued)

FOREIGN PATENT DOCUMENTS

DE       203 12 793 U1    1/2004
DE    20 2005 003 809 U1    8/2005
(Continued)

OTHER PUBLICATIONS

International Search Report dated Dec. 8, 2016, in PCT/FR2016/052217 filed Sep. 6, 2016.
(Continued)

*Primary Examiner* — Jose V Chen
(74) *Attorney, Agent, or Firm* — Oblon, McClelland, Maier & Neustadt, L.L.P.

(57) ABSTRACT

An item of equipment includes at least one worktop formed of at least one substrate made of transparent monolithic glass material with a surface area of greater than 0.7 m². The substrate exhibits a light transmission $T_L$ of greater than 10% and an opacity indicator of between 5 and 90. The substrate is predominantly or completely bare or provided with coating(s) such that the substrate, thus coated, exhibits a haze of less than 15% and/or a light transmission $T_L$ of greater than 60% and/or an opacity indicator of less than 85. The item of
(Continued)

equipment also includes at least one heating element and at least one interface for communication with at least one element of the worktop and/or with at least one external element for wireless communication. The item of equipment is devoid of light source(s).

20 Claims, 1 Drawing Sheet

(51) Int. Cl.
  *C03C 10/00* (2006.01)
  *F24C 15/10* (2006.01)
  *F24C 7/08* (2006.01)

(58) Field of Classification Search
  USPC ............ 108/50.11, 50.13, 23; 126/211
  See application file for complete search history.

(56) References Cited

U.S. PATENT DOCUMENTS

| | | | | |
|---|---|---|---|---|
| 5,958,272 | A * | 9/1999 | Taplan | G01G 19/56 |
| | | | | 219/445.1 |
| 6,080,972 | A * | 6/2000 | May | A21B 1/02 |
| | | | | 219/486 |
| 6,118,107 | A * | 9/2000 | Kobrich | H05B 3/746 |
| | | | | 219/443.1 |
| 6,133,552 | A * | 10/2000 | Saulnier | G01J 5/041 |
| | | | | 219/446.1 |
| 6,350,971 | B1 * | 2/2002 | Smolenski | H05B 3/746 |
| | | | | 219/447.1 |
| 8,276,506 | B2 * | 10/2012 | Tojo | B25J 9/0003 |
| | | | | 99/325 |
| 8,362,906 | B1 | 1/2013 | Glassman et al. | |
| 8,420,984 | B2 * | 4/2013 | Kaiser | H05B 3/746 |
| | | | | 219/448.12 |
| 8,925,445 | B2 * | 1/2015 | Park | F24C 15/327 |
| | | | | 126/20 |
| 8,931,400 | B1 * | 1/2015 | Allen | H04Q 9/00 |
| | | | | 99/344 |
| 10,092,129 | B2 * | 10/2018 | Jenkins | A47J 27/62 |
| 10,154,757 | B2 * | 12/2018 | Veltrop | A47J 39/006 |
| 2002/0190057 | A1 | 12/2002 | Staebler et al. | |
| 2003/0034898 | A1 * | 2/2003 | Shamoon | G08C 17/02 |
| | | | | 340/12.22 |
| 2004/0007566 | A1 | 1/2004 | Staebler et al. | |
| 2005/0095430 | A1 | 5/2005 | Veerasamy | |
| 2007/0045278 | A1 * | 3/2007 | Dittrich | H05B 3/746 |
| | | | | 219/446.1 |
| 2007/0232476 | A1 | 10/2007 | Siebers et al. | |
| 2009/0142603 | A1 | 6/2009 | Veerasamy | |
| 2010/0101254 | A1 * | 4/2010 | Besore | G06Q 50/06 |
| | | | | 62/264 |
| 2010/0130342 | A1 | 5/2010 | Siebers et al. | |
| 2010/0186600 | A1 * | 7/2010 | Lewis | A47J 27/62 |
| | | | | 99/327 |
| 2010/0273002 | A1 | 10/2010 | Veerasamy | |
| 2013/0019638 | A1 | 1/2013 | Veerasamy | |
| 2013/0093575 | A1 | 4/2013 | Glassman et al. | |
| 2013/0256301 | A1 * | 10/2013 | Laurent | C03C 3/085 |
| | | | | 219/649 |
| 2013/0299856 | A1 | 11/2013 | Verger et al. | |
| 2014/0231406 | A1 * | 8/2014 | Tsang | A61M 5/44 |
| | | | | 219/394 |
| 2014/0345474 | A1 * | 11/2014 | Trench Rocha | A47J 43/04 |
| | | | | 99/325 |
| 2015/0001203 | A1 * | 1/2015 | Brown | F24C 7/082 |
| | | | | 219/391 |
| 2015/0042453 | A1 * | 2/2015 | Beifuss | F24C 7/082 |
| | | | | 340/5.64 |
| 2015/0253486 | A1 | 9/2015 | Verger et al. | |
| 2016/0120028 | A1 * | 4/2016 | Bach | H05K 1/0274 |
| | | | | 345/174 |
| 2018/0270911 | A1 * | 9/2018 | Debreyer | A47B 13/12 |
| 2018/0313544 | A1 * | 11/2018 | Lee | F24C 3/126 |

FOREIGN PATENT DOCUMENTS

| | | |
|---|---|---|
| DE | 20 2006 012 631 U1 | 11/2006 |
| DE | 10 2005 039 298 A1 | 2/2007 |
| DE | 20 2011 109 214 U1 | 3/2012 |
| EP | 1 272 007 A2 | 1/2003 |
| EP | 1 837 314 A1 | 9/2007 |
| EP | 2 217 036 A1 | 8/2010 |
| WO | 2012/098330 A1 | 1/2012 |
| WO | 2012/080672 A1 | 6/2012 |
| WO | 2014/009630 A1 | 1/2014 |
| WO | 2014/108521 A1 | 7/2014 |

OTHER PUBLICATIONS

Anonymous: "Multimedia Countertop Lamps: Electrolux Ice", Internet URL:https://web.archive.org/web/201550602064726/htpp://www.trendhunter.com/trends/electrolux-ice, Jun. 2, 2015 XP055279784, 3 pages.

Wendy Ju et al., "CounterActive: An Interactive Cookbook for the Kitchen Counter", MIT Media Lab, Proc. of 2001 Conference on Human Factors In Computing Systems, Internet <URL:http://www.media.mit.edu/pia/counteractive/counteractive-final.pdf>, Apr. 1, 2001, XP007906856, 2 pages.

Anonymous: "Living Kitchen 2015: Die Highlight | eKitchen", Internet <URL:http://www.ekitchen.de/kuechengeraete/news/living-kitchen-2015-44771.html>, Jan. 22, 2015, XP055279772, 3 pages.

Anonymous: "Beeindruckende neue Kuechenwelt | Blog | Schott Ceran", Internet <URL://http:www.schott-ceran.com/blog/beeindruckende-neue-kuechenwelt/>, Jan. 27, 2015, XP055281217, 5 pages and Anonymous: "Beeindruckende neue Kuechenwelt | Blog | Schott Ceran," Internet URL://http:www.schott-ceran.com/blog/wp-content/uploads/2015/01/Kueche_Der_Zukunft.jpg, Jan. 27, 2015, XP055281228, 2 pages.

BauknechtGlobal: "IMM/LivingKitchen 2015 Koeln- Bauknecht Interaktive Kochflaeche/Interactive Cooktop (Deutsch)", Internet <URL:https://www.youtube.com/watch?v=67bcl0Xrlf8>, Jan. 27, 2015, XP054976592, 1 page.

Whirlpool USA: "Whirlpool Interactive Cooktop at CES 2014", Internet <URL:https://www.youtube.com/watch?v=6frHH50tXU4>, Jan. 9, 2014, XP002734990, 1 page.

Diana Barile, "0204 Supersedes All Previous Releases Product Information", Internet <URL:http://atkinsonsmirrorandglass.com/wp-content/uploads/2013/05/ROBAX-tech-specs.pdf>, Nov. 16, 2004, XP055279700, 2 pages.

Schott: "Schott Robax Home Tech Schott Robax Transparent Glass Ceramics for Extreme Temperature", Internet <URL:http://usktr.com/schott_robax.pdf>, Apr. 12, 2005, XP055279645, pp. 1-30.

Lux Glass: "Glass Worktops & Glass Cooker Splashbacks- Lux Glass" Internet <URL:https://web.archive.org/web/20150220013836/http://www.luxglassuk.co.uk/glass-worktops.php>, Feb. 20, 2015, XP055279600, 1 page.

Lux Glass: "Gallery of Our Work- Lux Glass", Internet <URL:https://web.archive.org/web/20150701170915/http://www.luxglassuk.co.uk/gallery.php>, Jul. 1, 2015, XP055279607, 3 pages.

Anonymous: "Glass Worktops for Kitchens Including a Nationwide Template and Installation Service", Internet <URL:https://web.archive.org/web/20150712012520/http://www.kitchencalm.co.uk/glasshome.htm>, Jul. 12, 2015, XP055279618, 5 pages.

Anonymous: "Kitchen Splashbacks in Glass and Kitchen Worktops in Glass- Technical Data", Internet <URL:https://web.archive.org/web/20150722055822/http://www.kitchencalm.co.uk/glasstechnical.htm>, Jul. 22, 2015, XP055279621, 3 pages.

Anonymous:"6x3 Designer Italian Glass Office Desk Range, Office Tables and Boardroom Tables", Internet <URL://https://web.archive.org/web/20150712005149/http://www.laporta.co.uk/products/desks_6x3.html>, Jul. 12, 2015, XP055279632, 6 pages.

(56) References Cited

OTHER PUBLICATIONS

Herwig Scheidler et al., "L120-AL203-Sl02 Glass-Ceramics", American Ceramic Society Bulletin, American Ceramic Society, vol. 68, No. 11, Nov. 1, 1989, XP000126064, pp. 1926-1930.
Anonymous: "DTiM1000C Zoneless Piano Induction Hob Premium Induction Hob", Internet <URL:https://web.archive.org/web/20150815063410/http://www.dedietrich.co.uk/premium/93cm-zoneless-induction-hob-the-piano-p-20002126.html?cPath=155_123_138>, Aug. 15, 2015, XP055281949, 2 pages.
Bosch: "Bosch PKE611B17E Electric Cooktop", Internet: <URL:http://www.plumbingplace.co.uk/skin/common_files/images/ceramic-hob.pdf>, ,Mar. 25, 2014, XP055281940, 2 pages.
Lamona: "User & Installation Guide Ceramic 5 Zone Touch Control Hob Contents & Introduction", Internet <URL:https://www.howdens.com/media/library/pdf/2031.pdf>, Mar. 3, 2015, XP055281957, 24 pages.
Anonymous: "AGA | 5 Oven Total Control Electric Range Cookers", Internet <URL:http://web.archive.org/web/20150506002054/http://www.agaliving.com/aga-range-cookers/range-cookers/aga-total-control/5-oven-aga-total-control#Productdetailstabarchtype>, May 6, 2015, XP055281978, 3 pages.

* cited by examiner

GLASS CERAMIC WORKTOP

The present invention relates to a worktop, or work table or counter or piece of furniture, formed of at least one large-sized plate positioned or intended to be positioned horizontally on one or more supporting elements (casing of a piece of furniture, supporting leg(s)) in order to provide a stable surface intended for different uses. In particular, the present invention relates to a table or a piece of furniture exhibiting a surface or platform (generally horizontal in the position of use) capable of making possible, simultaneously or successively, different activities and/or support for objects (this surface or platform thus forming what is known as a worktop), in particular which can make possible the cooking or the reheating of food in appropriate containers and provide other uses.

The materials normally used to produce worktops are, for example, wood, quartz, Cohan® and the like. For the cooking of food, there furthermore exist large-sized cooking surfaces in kitchens, in particular for professional use, these plates generally being metal and/or composite plates. In particular, there exist multilayer panels, based on ceramic layers or materials, such as stoneware, on metal layers or materials of aluminum type or on insulating plastic layers or materials of Bakelite type, these panels exhibiting a high thickness (of the order of 12 mm, for example) and being complex to produce.

At the same time, cooking tops made of materials of strengthened glass or glass-ceramic type, of more limited dimensions (in particular with a surface area generally of less than 0.4 m², it being possible for plates with a greater surface area to be more difficult to obtain by the processes normally used and to present problems in terms of flatness, handling, and the like), exist, in particular for domestic uses, the use of glass-ceramic material having become widespread in recent years for cooking plates, due in particular to the performance qualities of this material for this use and the attractive appearance of the plates produced.

There currently exist different types of glass-ceramic plates, each variant being the result of major studies and of numerous tests, given that it is very problematic to modify these plates and/or the process by which they are produced without the risk of having an unfavorable effect on the properties desired: in order to be able to be used as cooking plate, a glass-ceramic plate generally has to exhibit a transmission in the wavelengths of the visible region which is both sufficiently low to conceal at least a portion of the underlying heating elements when turned off and sufficiently high for, depending on the situation (radiant heating, induction heating and the like), the user to be able to visually detect the heating elements in the operating state for the purpose of safety; it should also exhibit a high transmission in the wavelengths of the infrared region in the case in particular of plates having radiant heating elements. The plates thus designed are intended exclusively for use as cooking plates and are conventionally neither intended to receive objects other than the heat-resistant utensils used for the cooking of food nor intended for the practice of activities other than the cooking of food.

The present invention has sought to widen the range of the existing household equipment products, having domestic or professional use, by developing interactive products of a novel type making possible more varied uses.

This aim has been achieved by the novel item of equipment or article or installation according to the invention, which is advantageously interactive, this item of furniture/household equipment (or piece of furniture) comprising:

- at least one worktop (or work counter or work table) formed of at least one substrate (in particular plate or surface or platform) made of (or based on or of a or essentially composed of a) transparent (exhibiting in particular a light transmission of greater than 10%) monolithic (or monoblock or with just one supporter) glass material (preferably made of glass-ceramic), which is advantageously essentially flat, with a surface area (length times width of its face with the greatest dimensions) of greater than 0.7 m², said substrate exhibiting a light transmission $T_L$ of greater than 10% and an opacity indicator of between 5 and 90, said substrate in particular being (predominantly, indeed even completely) bare (uncoated or provided with coating(s) over a limited portion of its surface, in particular over less than 10% of its surface) or provided with coating(s) such that the substrate, thus coated, exhibits a haze of less than 15% and/or a light transmission $T_L$ of greater than 60% and/or an opacity indicator of less than 85,
- at least one heating element (in particular under the substrate and hidden by the latter when this heating element is not in operation/is turned off),
- at least one interface for communication with at least one element of the top (for example with the heating element(s)) and/or, if appropriate, with at least one external element (outside the top), for example with an external module (unit, device), for wireless communication,
- and optionally an element, in particular an (essentially) flat element, added to the substrate or worktop, in particular so that the assembly formed by the substrate (bare or, if appropriate, coated) or worktop and the added element exhibits a haze of greater than 15% and/or a light transmission $T_L$ of less than 60% and/or an opacity indicator of greater than 85, said item of equipment additionally being devoid of light source(s) (or source(s) having an (exclusively) illumination use).

The product developed according to the invention meets the desired aim, the present invention thus providing a novel interactive item of equipment (making possible in particular the activation of functions, such as the cooking of food) which is can be used just as well in the kitchen as in another habitable room, it being possible for the worktop to form part of an uninterrupted or interrupted piece of furniture, of a table, of a counter, and the like, this worktop being mounted or capable of being mounted horizontally on (in particular on the top of) one or more supporting elements (casing of a piece of furniture, supporting leg(s)) in order to provide a stable surface intended for different uses, the worktop or the item of equipment according to the invention exhibiting a continuous upper surface capable of making possible, simultaneously or successively, activities (such as work, games, reading, and the like), the support for objects (such as pieces of paper, computers, vases, dishes, and the like) and the preparation or the cooking or the reheating of food in appropriate containers.

More generally, the invention also relates to a worktop formed of at least one substrate made of transparent monolithic glass material with a surface area of greater than 0.7 m², said substrate exhibiting a light transmission $T_L$ of greater than 10% and an opacity indicator of between 5 and 90, and being predominantly or completely bare or provided with coating(s) such that the substrate, thus coated, exhibits a haze of less than 15% and/or a light transmission $T_L$ of greater than 60% and/or an opacity indicator of less than 85, the substrate optionally being coupled to an element added to the substrate or worktop, in particular so that the assembly formed by the substrate or worktop and the added element exhibits a haze of greater than 15% and/or a light transmission $T_L$ of less than 60% and/or an opacity indicator of greater than 85, this worktop being intended to equip a multiuse interactive piece of furniture or item of equipment (intended for multiple uses, such as are listed in the preceding paragraph), in particular as defined above according to the invention.

The invention also relates to the use of a substrate, in particular of a plate, made of transparent monolithic glass material with a surface area of greater than 0.7 m², said substrate exhibiting a light transmission $T_L$ of greater than 10% and an opacity indicator of between 5 and 90, and being predominantly or completely bare or provided with coating(s) such that the substrate, thus coated, exhibits a haze of less than 15% and/or a light transmission $T_L$ of greater than 60% and/or an opacity indicator of less than 85, as multiuse interactive worktop as mentioned in the paragraphs above.

As indicated above, the worktop is formed of a large-sized substrate or plate made of monolithic glass material (the glass material having been formed of a single block/as a single part, even though the substrate can, if appropriate, exhibit recesses, generally produced in the part after it has been formed, for esthetic or functional purposes), the advantage of such a large-sized monolithic plate being in particular that of providing a predominantly continuous/uniform/join-free surface which is attractive and easy to maintain, and also greater comfort of use and greater safety (in terms of impermeability, in the event of spilling liquids, and the like), and the like. The substrate essentially, indeed even solely, comprises the glass material, it being possible for this substrate/glass material, if appropriate, to be provided with thin decorative or functional coatings (in particular of the order of a few tens of nanometers to a few hundred microns, indeed even more, in thickness), for example made of enamel, paint, thin layers and the like, this coating or these coatings covering a limited portion of its surface, that is to say advantageously less than 10%, especially less than 5%, in particular less than 1%, of its surface, and/or being such that the substrate provided with this/these coating(s) exhibits a haze of less than 50% and/or a light transmission $T_L$ of greater than 60% and/or an opacity indicator of less than 85, as specified above.

Contrary to the practice in the field of glass-ceramics in particular, this (substrate made of) glass material is large-sized, its surface area (corresponding to the product of its length by its width for its face having the largest dimensions—generally its upper face, which is intended to be visible and to act as support for (household or working or cooking) articles) having dimensions of greater than 0.7 m², preferably of greater than 0.9 m², in particular of greater than 1 m² and especially of greater than or equal to 2 m². In point of fact, the manufacture of large plates, in the case of glass-ceramics in particular, presents numerous problems as regards flatness and handling. In the present invention, a large-sized plate, even so exhibiting a good flatness, can nevertheless advantageously be obtained by reducing the rate of passage (or lengthening the ceramization furnace or increasing the residence time in the furnace), with respect to the speed (or to the standard length of the furnace or to the standard time) normally used to obtain glass-ceramic plates of normal dimensions of less than 0.4 m², as explained subsequently in the process according to the invention.

In the present invention, the substrate made of glass material thus advantageously forms the major part (at least 50%), indeed even all, of the worktop or of its surface or face intended to be used for various purposes (generally upper face in the position of use). In particular, the substrate made of glass material advantageously occupies, in the present invention, at least 50%, in particular at least 70%, especially at least 90%, of the surface (generally measured on the upper face, intended to be visible and to be used as support for articles) of the worktop, and it generally occupies the entire surface of the worktop, the surface of the worktop being understood as the uninterrupted surface occupied by the worktop (surface which it occupies with the exclusion of that/those occupied by possible recesses (such as a recess in the top for incorporating a sink)) on the face under consideration (generally its upper face, intended to be visible and to act as support for articles), indeed even being understood in particular as the overall surface corresponding to the product of the length of the worktop by its width). Depending on the type of piece of furniture (in particular in the case of a piece of furniture where the worktop occupies the whole of one of its faces, generally the upper face, for example a table, a central island or a simple worktop), the substrate made of glass material can thus also occupy at least 50%, in particular at least 70%, especially at least 90%, of the surface of a face, in particular of the upper face (in the position of use), of the piece of furniture, indeed even occupy all of said surface.

Advantageously, the substrate made of glass material forms at least 50%, in particular at least 70%, especially at least 90%, indeed even the whole, of the worktop or, in other words, the worktop (generally on the upper face or forming the upper face of the piece of furniture) is mainly (to at least 50%, in particular at least 70%, especially at least 90%), in particular entirely (or solely), formed of (or constituted by the, or consists of the) substrate made of glass material (this glass material preferably being glass-ceramic).

The substrate/glass material according to the invention is advantageously flat (or predominantly or virtually flat) and in particular exhibits a flatness (height between the highest point and the lowest point of the substrate, with respect to the mean plane of the substrate, excluding any possible deliberate deformations produced on the substrate for esthetic or functional purposes) of less than 0.1% of the diagonal of the substrate and preferably of less than 3 mm, in particular of less than 2 mm, especially of less than 1 mm, indeed even of the order of zero, depending on the size/surface area/diagonal of the substrate, the flatness being measured using a SurFlat reference waviness meter sold by Visuol. The substrate is generally of geometric shape, in particular rectangular, indeed even square, indeed even circular or oval, and the like, and generally exhibits an "upper" face (face which is visible) in the position of use, another "lower" face (generally hidden, in the framework or casing of the piece of furniture incorporating the worktop) in the position of use, and an edge face (or edge or thickness). The upper face is generally flat and smooth but may also exhibit at least one protruding zone and/or at least one recessed zone and/or at least one opening and/or beveled edges (these shapes having been added during the manufacture of the substrate, for example by rolling, gravity bending or pressing, and the like, or having been added in off-line operations), and the like, these variations in shape advantageously constituting continuous variations in the plate (without change in materials or joins). The lower face can in particular be smooth or provided with tear drops increasing its mechanical strength and obtained, for example, by rolling.

The thickness of the monolithic substrate made of glass material used is generally at least 2 mm, in particular at least 2.5 mm, especially is of the order of 3 to 30 mm, and advantageously is less than 15 mm, especially is of the order of 3 to 15 mm and in particular of 3 to 10 mm.

The glass material of the substrate used is advantageously resistant to high temperatures and/or exhibits an expansion coefficient of zero or virtually zero (for example of less than $15.10^{-7}$ $K^{-1}$) and in particular is advantageously glass-ceramic or a strengthened (in particular chemically or thermally tempered) glass. Preferably, the substrate is a substrate made of glass-ceramic and can, for example, be of the type of the plates sold under the KeraLite name by Eurokera. As defined according to the invention, the glass material is advantageously transparent, in particular exhibits a light transmission $T_L$ of greater than 10%, and also an opacity indicator of between 5 and 90, preferably of between 5 and 85. In an advantageous embodiment, it exhibits a light transmission $T_L$ of between 10% and 20%; in another advantageous form, it exhibits a light transmission $T_L$ of greater than 60%, in particular of greater than 70%.

The glass-ceramic used can in particular have a composition as described in the patent applications published under the following numbers: WO2013171288, US2010167903, WO2008065166, EP 2 086 895, JP2010510951, EP 2 086 896, WO2008065167, US2010099546, JP2010510952, EP 0 437 228, this glass-ceramic being in particular a lithium aluminosilicate glass-ceramic.

The glass-ceramic may be refined with arsenic (that is to say, have (a mother glass with) a composition comprising of the order of 0.2% to 1.5% by weight of arsenic oxide (expressed as $As_2O_3$)) or may not be refined with arsenic (in particular exhibiting a content of arsenic oxides of less than 0.2%, in particular of less than 0.1%, indeed even zero) or refined with tin or refined with sulfide(s), and may be obtained by rolling or by the float glass process.

The glass material can also be a nonceramized tempered glass, for example a tempered lithium aluminosilicate colored in its bulk, such as described in the patent applications published under the following numbers: FR 1 060 677 and WO2012080672, or else a tempered glass of another type (soda-lime, borosilicate, and the like), for example as described in the application published under the number WO2012146860.

The glass-ceramic or the tempered glass are obtained by the respective processes described in the abovementioned documents using the treatment temperatures and cycles which make it possible to obtain the glass material exhibiting the selected characteristics given in the definition of the invention. In the case of the glass-ceramics, these processes are preferably modified by reducing the rate of passage by at least 25%, preferably by at least 50%, or by increasing the length of the ceramization furnace or the residence time in said furnace by at least 25%, preferably by at least 50%, with respect to the rates, lengths and times, respectively, normally used, in order to obtain a large-sized flat substrate as required according to the invention, as explained subsequently. The substrate made of transparent glass-ceramic generally comprises crystals of β-quartz structure within a residual vitreous phase, the absolute value of its expansion coefficient advantageously being less than or equal to $15.10^{-7}/°C.$, indeed even $5.10^{-7}/°C.$, this glass-ceramic being, for example, that of the plates sold under the KeraLite name by Eurokera.

If appropriate, the glass material can also comprise colorants giving specific colorings to the substrate, for example vanadium oxide, iron oxide, cobalt oxide, cerium oxide, selenium oxide, chromium oxide, indeed even nickel oxide, copper oxide and/or manganese oxide, and the like.

As indicated in the definition of the invention, the substrate/glass material is bare or provided with a coating as defined above in the invention, it being possible for this substrate to be, in addition and if appropriate, coupled to an element added to the substrate or worktop, as indicated above, it being possible for this added element to act, for example, as reinforcer, or as masking means intended to mask at least a portion of the underlying elements (in particular heating means when turned off), and/or, if appropriate, it being possible for this added element to make it possible to confer an opacity/low transmission and/or a haze which are favorable in particular to the detection of the heating elements when they are activated. Coupled is understood to mean that the element modifies the characteristics, for example optical or strength characteristics, of the substrate for the use thereof as worktop or in the item of equipment according to the invention. Added is understood to mean manufactured separately from the substrate (in contrast to a coating obtained by direct deposition on the substrate), it being possible for this element to be subsequently combined with the substrate or with the worktop by adhesive bonding, soldering, and the like, it being possible, if appropriate, for this element to be located at a distance from the substrate (for example from one to a few millimeters below) and not fixed to or against or on said substrate.

The coating, when it is present on the substrate, can, if appropriate, be provided in the form of at least one layer of enamel or of paint or of thin layers, over less than 10% of the surface of the substrate or so that the substrate provided with the coating exhibits a haze of less than 15% and/or a light transmission $T_L$ of greater than 60% and/or an opacity indicator of less than 85, as defined above.

The element added can, for example, be a slab or sheet of mica, of wood, of plywood, of laminate, of plastic (for example PVB—polyvinyl butyral—or polycarbonate or Bakelite, and the like), of glass, of stone, and the like, in particular with a thickness of 0.1 to 100 mm, and rendered integral with the substrate, for example by adhesive bonding, rolling, calendering, fixing to the same frame or to the same framework, it being possible for the added element to be placed against the substrate or at a distance (if appropriate using spacers and the like), the added element advantageously being coupled to the substrate while being under the latter (in the position of use).

When the added element is used, for example, as masking means intended to mask at least a portion of the underlying elements, it is preferably chosen so that the assembly formed by the substrate (bare or coated as defined above) or worktop and the added element exhibits a haze of greater than 15%, in particular of greater than 40%, indeed even of greater than 60%, and/or a light transmission $T_L$ of less than 60%, in particular of less than 50%, indeed even of less than 30% (this light transmission being in particular nonzero/greater than 0) and/or an opacity indicator of greater than 85, preferably of greater than 90 (and in particular of less than 100), over the majority (in particular over at least 80%, indeed even 90%, indeed even 100%) of its surface, except for possible localized decorations or localized components applied to its surface. When the added element acts as reinforcement, it is chosen, for example, for its good strength, and the like.

The haze measures the level of light scattering and is defined, in the context of the invention, as being the ratio of the diffuse transmission to the total transmission at a wavelength equal to 550 nm, this haze being evaluated, for example, using the spectrophotometer equipped with an integrating sphere used for the light transmission measurements.

The light transmission $T_L$ is measured according to the standard ISO 9050:2003 using the illuminant D65 and is the total transmission (integrated in the visible region), taking into account both direct transmission and possible diffuse transmission, the measurement being carried out, for example, using a spectrophotometer equipped with an integrating sphere, the measurement at a given thickness subsequently being converted, if appropriate, to the reference thickness of 4 mm according to the standard ISO 9050:2003.

The opacity indicator (or factor or coefficient) $\Omega$ is determined in the present invention by the formula $\Omega=100-\Delta E^*$ and is evaluated by measuring (colorimetry in reflection carried out using a Byk-Gardner Color Guide 45/0 colorimeter) the variation in color $\Delta E^*$, corresponding to the difference between the color, measured in reflection on the upper face of the substrate or of the assembly evaluated, for the substrate (respectively the assembly) placed on an opaque black background and the color for the substrate (respectively the assembly) placed on an opaque white background ($\Delta E^*=((L_B^*-L_W^*)^2 (a_B^*-a_W^*)^2 (b_B^*-b_W^*)^2)^{1/2}$, according to the formula drawn up by the CIE in 1976, $L_W^*$, $a_W^*$ and $b_W^*$ being the color coordinates of the first measurement on the white background and $L_B^*$, $a_B^*$ and $b_B^*$ being those of the second measurement on the black background in the colorimetric system established by the CIE in 1976).

The assembly formed by the substrate and the optional added element according to the invention makes it possible, if appropriate, to signal the cooking zones, when they are in the operating state, this assembly masking, in one and the same step, the elements placed below (such as the heating elements and cables). Conversely, the use of the bare or only slightly coated substrate, not coupled to an added element having a partially opacifying effect, makes it possible to get a better view of the inside of the item of equipment (for example the contents of drawers) or makes it possible to get a better view of display elements placed below (for example a screen making possible the display of data, information, recipes and the like).

As defined above, the article according to the invention also comprises at least one heating element, for example one or more radiant or halogen heating elements or one or more gas burners and/or one or more inductive heating means, these heating means generally being located under the worktop. The worktop of the article according to the invention can comprise one or more heating elements as well as one or more stove top burners. The term "stove top burner" is understood to mean a cooking location. The article according to the invention can comprise several types of heating elements or stove top burners (stove top gas burners, stove top radiant burners, halogen stove top burners or inductive stove top burners). Preferably, the article according to the invention comprises, as heating element(s), one or more inductive heating means.

The heating mean(s) can be located in a defined zone (for example on one end of the substrate) or several zones of the substrate or can be uniformly distributed under the substrate, for example occupying at least 25% of the surface area of the substrate, indeed even can occupy a surface area virtually equivalent to that of the substrate (for example more than 50%, in particular more than 75%, indeed even more than 85%, indeed even 100%, of the main surface area of the substrate), a plurality of small-sized inductors, for example, lining the substrate under its lower face, in order to make possible heating, if necessary, in any zone.

The cooking locations on the worktop, straight above the heating means, can, if appropriate, be signaled (or not, in the case, for example, of the use of a bare substrate or in the case of a top equipped with heating means covering the whole of its areal extent), on activation and/or permanently, in particular by means of a permanent decoration, for example made of enamel. The patterns making it possible to signal the cooking zones (as well as patterns which may signal other zones or functions or form decorations) can be larger or smaller in size; for example, they may be circles, each delimiting heating elements, or small patterns (triangles, crosses, and the like) at the center thereof or at the base thereof, and the like. The absence of light sources, integrated in the item of equipment, in order to signal, for example, the heating zones (the latter being signaled, if need be, by fixed patterns in the present invention) or in order to illuminate displays or to cause other light effects, exhibits the advantage of being more economic, of making the item of equipment easier to maintain, of offering greater safety and simplicity in the handling of the item of equipment, said item of equipment generally being intended to be used in environments already provided with illumination means (natural or artificial illumination means, such as a living room, a terrace, and the like).

Preferably, the cooking locations (and/or, if appropriate, other zones and/or elements and/or functions and/or decorations) are thus signaled permanently by a fixed pattern (in particular of round circle, cross, triangle, rectangle, or other nongeometric decoration, and the like, type), in particular obtained by deposition of layer(s) (especially such as those used for the decoration of glass-ceramics), for example made of enamel or paint, at the surface of the plate (in particular on the upper face, or optionally lower face according to the type of coating).

As indicated above, the item of equipment according to the invention also comprises at least one interface for communication with at least one element of the top (such as the heating element(s)) and/or with an element external to the top, for example for wireless communication.

This (in particular man-machine or machine-machine) communication interface can be a device which makes it possible in particular to control or to transmit commands to the heating elements from or via control buttons or keys integrated into the worktop or offset onto an external element which is advantageously detachable or movable, in the case in particular of a command by wireless communication.

Preferably, the interface makes possible wireless communication with a unit external to the worktop (it being possible for this unit to form part of the item of equipment according to the invention and to itself constitute an interface), for example making possible the remote activation of the heating zones and/or the control of different functions (increase or decrease in the power or in the heating time, and the like), the commands given by the external unit being transmitted by the interface to the relevant components of the item of equipment. The interface can also be a control interface located on the top (control panel) which transmits the commands by wires or optionally wirelessly to other components of the top or outside the top.

The external unit in the case of remote control can, for example, be in the form of a keyboard, a tablet, a touch screen or a cellphone, it being possible for this unit to be stationary (for example fastened to a wall) or movable (being able, if appropriate, to be placed on the worktop). This embodiment exhibits in particular the advantage of preventing finger marks (which are unsightly and obvious on glass materials) on the worktop or the cooking zones. Remote activation of the controls also makes it possible to reduce the risks of burns as the controls close to the cooking zones are not handled. For the sake of safety in particular, the wireless communication can advantageously be planned to be of limited range (for example range limited to the volume of the room in which the item of equipment is located) and/or equipped with safety features in order to prevent inadvertent activation by a person not present. The wireless communication in particular is achieved via electromagnetic or radio waves, if appropriate using systems of Bluetooth, WLAN, Wi-Fi, RFID chip, and the like, type.

The interface can make it possible to transmit different signals initiated by contact or even by movement in order to activate different components, as already mentioned (for example, it may convert a movement, detected by sensors by triangulation, these sensors being connected to this interface (and if appropriate forming part thereof), into the activation of a function (for example the increase in the heating power, and the like)).

At least one interface is generally located on or under the worktop or close by. The item of equipment according to the invention can also comprise several interfaces, of the same type or different types, for example making possible the activation of different elements, or the item of equipment can comprise several interfaces, if appropriate functioning differently (of different composition, operating at different frequencies, and the like), for managing one and the same element (for example a heating zone) with a higher level of safety. The interface can be formed of sensor(s), connector(s), control element(s), any other electrical or electronic or electromagnetic component, and the like. One or more control means or zones (in the form of keys, logos, indeed even keyboards, and the like) or indicators (of intensities/of power, of time, and the like), which are, for example, capable of being activated by contact on the surface of the top or remotely (in particular by wireless communication), or by simple movement of the hand, as already mentioned (by sensors located, if appropriate, on the exterior and recording the movement, for example by triangulation, in order to convert it, in particular using a suitable algorithm and a suitable interface, into the activation of a function, for example), or, if appropriate, by placing a predetermined object (saucepan, and the like) at a predetermined location (such as a cooking zone) of the plate, can be connected to or form part of the interface(s).

Preferably, the item of equipment according to the invention comprises at least one interface for communication with at least one external element for the activation of different zones and/or functions of the substrate by wireless communication, in particular when the light transmission $T_L$ of the substrate is low.

Apart from the interface, the item of equipment or worktop can be equipped with different cables, connectors or other elements, in particular of electrical nature, which contribute to the transmission of commands from one part of the item of equipment to the other.

The item of equipment, in particular the worktop, according to the invention can also comprise various functional and/or decorative coatings as defined above according to the invention, in particular among those generally used with the glass materials in question, for example based on enamel, on paint, on thin (for example metal, dielectric, and the like) layer(s), and the like. For example, one of the faces of the substrate can comprise one or more enamel layers or one or more enamel patterns having a decorative purpose and/or in order to signal one or more elements (display devices, cooking zones, and the like) and/or acting as coloring layer and/or for other functions. In particular, the worktop can be equipped with a functional layer which confers on it one or more additional properties, such as anti-scratch, mechanical strengthening, anti-fingerprint, anti-overflow, and the like, properties. The coating can, for example, be formed by processes such as screen printing, cathode sputtering or pneumatic spraying deposition, inkjet printing, enamel jet printing, and the like, it being possible for the coating to be applied in particular, depending on the type of coating and on the desired function, to the visible face or to the opposite face.

The present invention also relates to a process for the manufacture of an item of equipment according to the invention, in particular of the worktop of said item of equipment, when this worktop is formed of at least one glass-ceramic substrate with a surface area of greater than 0.7 m², in which at least one cycle of ceramization of a glass plate with a surface area of greater than 0.7 m² is carried out in order to obtain said substrate, and according to which the rate of passage is reduced by at least 25%, preferably by at least 50%, or the length of the ceramization furnace or the residence time in said furnace is increased by at least 25%, preferably at least 50%, with respect to the optimal or normal rate, length or residence time respectively, in order to obtain a glass-ceramic substrate with a surface area of less than 0.4 m².

For the record, glass-ceramic plates are generally manufactured as follows: glass with the composition chosen for forming the glass-ceramic is melted in a melting furnace, the molten glass is then rolled to give a standard ribbon or sheet by passing the molten glass between forming rollers, and the glass ribbon is cut to the desired dimensions. Alternatively to the rolling, the glass can be produced by the float glass process, as described, for example, in the patent application WO2008056080, before, if appropriate, being cut up. The plates, already or not yet cut up, are subsequently ceramized in a way known per se, the ceramization consisting in baking the plates according to the temperature profile chosen in order to convert the glass into the polycrystalline material referred to as "glass-ceramic", the expansion coefficient of which is zero or virtually zero and which withstands a thermal shock which can range up to 700° C. The ceramization generally comprises a stage of gradual rise in the temperature up to the nucleation range, generally located in the vicinity of the range for transformation of the glass; a stage, lasting several minutes, of passing through the nucleation range; a new gradual rise in the temperature up to the temperature of the ceramization stationary phase; the maintenance of the temperature of the ceramization stationary phase for several minutes; and then a rapid cooling down to ambient temperature. If appropriate, the process also comprises a cutting operation (generally before ceramization), for example with a water jet, mechanical marking out with a cutting wheel, and the like, followed by a shaping operation (grinding, beveling, and the like). The process can also comprise a stage of rolling or gravity bending in order to form specific protrusions.

In the present invention, the glass-ceramic follows a ceramization cycle which gives it the desired properties, in particular a transparent appearance.

Other advantageous characteristics and details will emerge below from the description of a nonlimiting embodiment of the invention, with reference to the appended drawings, in which.

Figure 1:
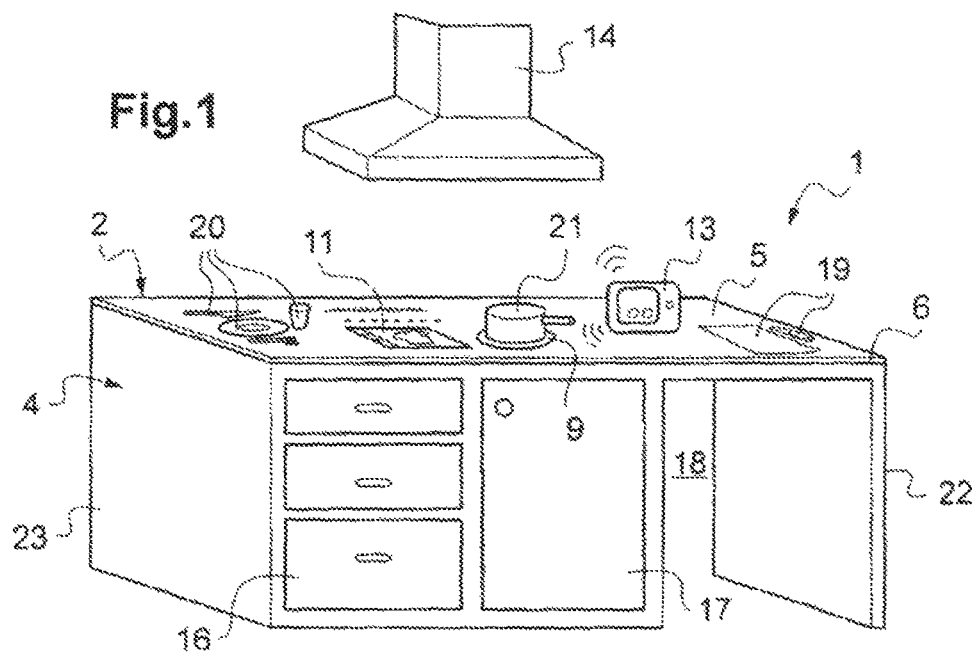
FIG. 1 represents a diagrammatic perspective view of an item of equipment according to the invention.
Figure 2:
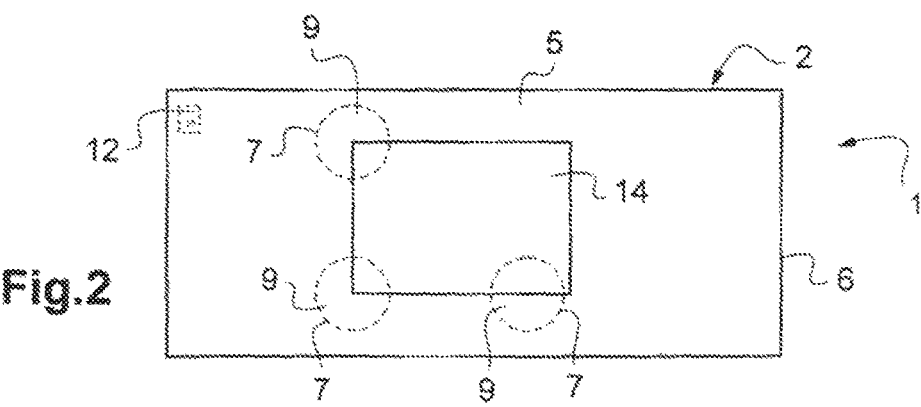
FIG. 2 represents a diagrammatic top view of a similar item of equipment (the utensils at the surface or the underlying elements of the piece of furniture not being represented)

In this example, the item of equipment (1) according to the invention comprises a piece of furniture (2) formed of a casing (4) surmounted by a worktop (5) formed of at least one substrate made of glass-ceramic with a surface area of 2.6 m², this substrate occupying the majority (in this instance all) of the surface (measured on the upper face) of the worktop and being formed of a transparent (monolithic) glass-ceramic plate (6), this plate/this substrate made of glass-ceramic being coupled to an added element (10) in the form of a laminate board (or chipwood panel) with a thickness of 8 mm, the glass-ceramic plate being of the type of that sold under the KeraLite reference by Eurokera, this plate exhibiting a smooth upper face and a smooth lower face (it also being possible for this face to be provided with tear drops) and a thickness of 5 mm, and exhibiting a light transmission $T_L$ of 88.38% and an opacity indicator of 26.21 (the assembly formed by the substrate and the laminate board exhibiting a light transmission $T_L$ of 0.01% and an opacity indicator of 100). The substrate is, for example, obtained by reducing, in the process for the manufacture of glass-ceramics of KeraLite type, the rate of passage in the ceramization furnace by 50%.

The substrate made of glass-ceramic obtained exhibits a flatness of less than 2 mm (the flatness obtained being between 2 and 3 mm for a rate reduced by only 25% and being more than 15 mm for a rate unchanged with respect to that used in the abovementioned patent application to order to obtain a plate with standard dimensions of less than 0.4 m²), the flatness desired for good optical properties and good coupling and thermal efficiency properties in particular being less than 3 mm and preferably less than 2 mm.

The item of equipment additionally comprises, in the present example, three heating elements (7), for example inductors, positioned under the plate (6). These inductors are, in the present case, distributed in the middle of the work surface but might just as easily be located at one end of the top.

The item of equipment also comprises decorations (9, 11), for example made of enamel, for example placed on the upper or lower face of the substrate. These decorations, for example in the form of circles of color (9) delimiting each location (it being possible for the colors, if appropriate, to be identical or different according to the locations) and encircling the inductors, make it possible, for example, to signal the cooking locations in order to prevent contact with them when the heating elements are activated. They can also consist of information, logos, images (11), and the like.

Figure 3:
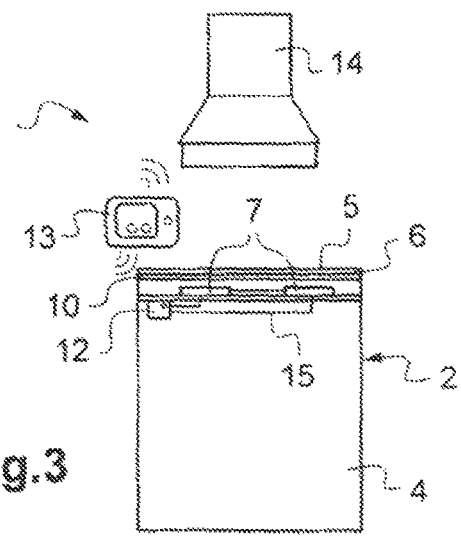
FIG. 3 represents a diagrammatic side view in which a section of the piece of furniture (23) has been removed in order to reveal certain components of the item of equipment.

The item of equipment additionally comprises at least one interface (12) (hidden by the substrate) for communication with the heating elements, this interface also communicating wirelessly with an external unit in the form, for example, of a touch tablet (13) for the activation of different zones and functions of the plate or of the item of equipment. The external unit can be advantageously movable and lie on the worktop (FIG. 1) or be used for the remote activation (FIG. 3) of different zones or functions. Alternatively or cumulatively, the interface might also comprise or be connected to a permanent control panel located on the surface of the substrate (2) for the activation of different zones and functions, in particular of the substrate.

If appropriate, the item of equipment can also be combined with or comprise a suction hood (14) overhanging the worktop.

The item of equipment also comprises other elements, in particular electrical cables (15) for the activation of the heating elements, and comprises drawers (16) or cupboards (17) inserted into the casing supporting the worktop, for storing various articles, and the like. The item of equipment can also comprise other elements; for example, the worktop can comprise a trim, the substrate can be coated with an decoration, for example made of enamel, the casing can be uninterrupted or comprise different recesses (such as the recess (18)) or integrate other elements (for example a built-in oven, and the like). The worktop (5) can be used for different purposes, such as writing (as symbolized by the paper and the pen (19)), the support for objects (as symbolized by the tableware (20)), while making possible the cooking of food (as symbolized by the cooking receptacles (21)), and the like. If appropriate, the casing can also be replaced by supporting legs (for example only the walls 22 and 23, or four legs at the four corners, the item of equipment under the worktop in this case preferably being hidden by a localized enclosure with a thickness of a few centimeters under the substrate), such as a table.

The item of equipment according to the invention can in particular be advantageously used to produce a new range of interactive and multiuse pieces of furniture in particular integrating cooking zones or a cooking function.

The invention claimed is:

1. An item of equipment, comprising:
   at least one worktop that includes a transparent monolithic tempered glass or glass-ceramic material substrate, a surface area of said substrate being greater than 0.7 m², a flatness of said substrate being less than 0.1% of a diagonal of the substrate, and an expansion coefficient of said substrate being less than or equal to $15 \cdot 10^{-7}$ $K^{-1}$, wherein a light transmission $T_L$ of said substrate is greater than 10% and an opacity indicator of said substrate is between 5 and 90;
   at least one heating element; and
   at least one interface for communication with at least one element of the worktop or with at least one external element for wireless communication,
   wherein said item of equipment is devoid of light source(s).

2. The item of equipment as claimed in claim 1, wherein the surface area of the substrate is greater than 0.9 m², a thickness of said substrate is at least 2 mm, and the thickness of the substrate is less than 15 mm.

3. The item of equipment as claimed in claim 1, wherein the substrate occupies at least 50% of the surface area of the worktop.

4. The item of equipment as claimed in claim 1, wherein the substrate includes β-quartz crystals in a residual vitreous phase.

5. The item of equipment as claimed in claim 1, wherein the substrate is predominantly or completely bare or coated, wherein, when coated, a haze of said coated substrate is less than 15%, or a light transmission $T_L$ of said substrate is greater than 60%, or an opacity indicator of said substrate is less than 85.

6. The item of equipment as claimed in claim 1, wherein a light transmission $T_L$ of said substrate is greater than 10% and less than or equal to 20%, or greater than 60%.

7. The item of equipment as claimed in claim 1, wherein the substrate includes colorants.

8. The item of equipment as claimed in claim 1, wherein the at least one heating element includes, at least one inductive heating means, the inductive heating means being located in one or more zones of the substrate or uniformly distributed under the substrate.

9. The item of equipment as claimed in claim 8, wherein cooking locations of the worktop located above the heating means, and/or other zones and/or elements and/or functions and/or decorations, are signaled by a permanent decoration.

10. The item of equipment as claimed in claim 1, wherein the item of equipment is configured to be activated by contact on at least one of the surface of the worktop, the interface, or the external element, or by movement.

11. The item of equipment as claimed in claim 1, wherein the interface is configured to perform wireless communication with the external element to the worktop.

12. The item of equipment as claimed in claim 1, wherein the worktop includes at least one added element in the form of a slab of mica, of wood, of plywood, of laminate, of plastic, of glass or of stone.

13. The item of equipment as claimed in claim 1, wherein the worktop is mounted on at least one supporting element forming a table, an uninterrupted or interrupted piece of furniture, or a counter.

14. A worktop, comprising:
at least one substrate including transparent monolithic tempered glass or glass-ceramic material, a surface area of said substrate being greater than 0.7 m², a flatness of said substrate being less than 0.1% of a diagonal of the substrate, and an expansion coefficient of said substrate being less than or equal to $15 \cdot 10^{-7}$ $K^{-1}$, wherein
a light transmission $T_L$ of said substrate is greater than 10% and an opacity indicator of said substrate is between 5 and 90, and
said substrate is predominantly or completely bare or coated, wherein, when coated, a haze of said coated substrate is less than 15% or a light transmission $T_L$ of said substrate is greater than 60% or an opacity indicator of said substrate is less than 85.

15. A method, comprising:
obtaining a transparent monolithic tempered glass or glass-ceramic material substrate, a surface area of said substrate being greater than 0.7 m², a flatness of said substrate being less than 0.1% of a diagonal of the substrate, and an expansion coefficient of said substrate being less than or equal to $15 \cdot 10^{-7}$ $K^{-1}$, wherein a light transmission $T_L$ of said substrate is greater than 10% and an opacity indicator of said substrate being between 5 and 90, wherein said substrate is predominantly or completely bare or coated, wherein, when coated, a haze of said coated substrate is less than 15% or a light transmission $T_L$ of said substrate is greater than 60%, or an opacity indicator of said substrate is less than 85; and
using the substrate with the item of equipment as claimed in claim 1.

16. The item of equipment as claimed in claim 1, further comprising an element added to the substrate or the worktop, an assembly of the added element and the substrate or the worktop having a haze greater than 15% or a light transmission $T_L$ less than 60%, or an opacity indicator greater than 85.

17. The item of equipment as claimed in claim 1, wherein the at least one element of the worktop, in communication with the at least one interface, is the at least one heating element.

18. The item of equipment as claimed in claim 1, wherein a thickness of said substrate is 3 to 30 mm.

19. The item of equipment as claimed in claim 1, wherein a flatness of said substrate is less than 3 mm.

20. The item of equipment as claimed in claim 1, wherein the interface is configured to perform wireless communication with the external element to the worktop, and remotely activate the at least one heating element or control more than one functions of the item of equipment.

* * * * *